United States Patent
Vinograd et al.

(10) Patent No.: US 11,258,867 B2
(45) Date of Patent: Feb. 22, 2022

(54) SYSTEMS AND METHODS FOR MANAGING A MULTI-REGION SAAS MODEL

(71) Applicant: Softimize Ltd., Yehud-Monosson (IL)

(72) Inventors: Guy Vinograd, Yehud (IL); Maor Last, Petah Tikva (IL); Yoav Ofan, Shaarey-Tikva (IL); Ben Rosencveig, Yehud (IL); Olga Shpigel, Beer Yaakov (IL); David Ronen, Kfar Saba (IL)

(73) Assignee: Softimize Ltd., Yehud-Monosson (IL)

( * ) Notice: Subject to any disclaimer, the term of this patent is extended or adjusted under 35 U.S.C. 154(b) by 0 days.

(21) Appl. No.: 17/148,621

(22) Filed: Jan. 14, 2021

(65) Prior Publication Data
US 2021/0227035 A1 Jul. 22, 2021

Related U.S. Application Data

(60) Provisional application No. 62/964,254, filed on Jan. 22, 2020.

(51) Int. Cl.
*H04L 29/08* (2006.01)

(52) U.S. Cl.
CPC .............. *H04L 67/18* (2013.01); *H04L 67/02* (2013.01); *H04L 67/16* (2013.01); *H04L 67/306* (2013.01); *H04L 67/34* (2013.01)

(58) Field of Classification Search
CPC ......... H04L 67/18; H04L 67/02; H04L 67/16; H04L 67/306; H04L 67/34
See application file for complete search history.

(56) References Cited

U.S. PATENT DOCUMENTS

| 9,338,595 | B1 | 5/2016 | Burgmeier et al. |
| 10,193,966 | B2 | 1/2019 | Labranche |
| 2011/0093265 | A1* | 4/2011 | Stent ................. G10L 15/06 704/243 |
| 2012/0239792 | A1 | 9/2012 | Banerjee et al. |
| 2012/0254434 | A1* | 10/2012 | Mehra ................ G06F 16/27 709/226 |
| 2012/0304169 | A1* | 11/2012 | Anderson ........ G06F 9/45533 718/1 |

(Continued)

FOREIGN PATENT DOCUMENTS

| WO | WO2014164076 A1 | 1/2016 |
| WO | WO2016/022908 A1 | 2/2016 |

OTHER PUBLICATIONS

International Search Report of PCT Application PCT/IL2021/050056 dated Apr. 7, 2021.

(Continued)

*Primary Examiner* — Jonathan A Bui
(74) *Attorney, Agent, or Firm* — Pearl Cohen Zedek Latzer Baratz LLP

(57) ABSTRACT

A system and method for detecting providing a multi-region software as a service model in a cloud computing system, including for example, obtaining a list of allowed regions that can host data of a user from a source region; and automatically assigning a device associated with a new user from the source region to a computing system located in one of the allowed regions. The source region may be determined based on location information obtained from the device during registration.

14 Claims, 4 Drawing Sheets

(56) References Cited

U.S. PATENT DOCUMENTS

| | | | | |
|---|---|---|---|---|
| 2013/0326506 | A1* | 12/2013 | McGrath | G06F 9/45558 |
| | | | | 718/1 |
| 2014/0378108 | A1* | 12/2014 | DeLuca | H04M 3/565 |
| | | | | 455/416 |
| 2015/0058486 | A1* | 2/2015 | Huang | G06F 9/4856 |
| | | | | 709/226 |
| 2017/0041296 | A1* | 2/2017 | Ford | G06F 16/951 |
| 2018/0132066 | A1 | 5/2018 | Carini et al. | |
| 2018/0260807 | A1* | 9/2018 | Yang | G06Q 20/18 |
| 2019/0098107 | A1* | 3/2019 | Howard | G06F 9/50 |
| 2020/0084303 | A1* | 3/2020 | Liu | H04L 67/18 |
| 2020/0159421 | A1* | 5/2020 | Karumbunathan | G06F 3/0662 |
| 2020/0256684 | A1* | 8/2020 | Rao | G01C 21/3484 |
| 2020/0380112 | A1* | 12/2020 | Allen | G06N 5/006 |
| 2021/0081561 | A1* | 3/2021 | Blandin | G06F 21/6227 |
| 2021/0099462 | A1* | 4/2021 | Curtis | H04L 63/107 |

OTHER PUBLICATIONS

DLA Piper Data Protection Laws of the World—printed on Aug. 3, 2021 https://www.dlapiperdataprotection.com/index.html.

Health Information Privacy-HHS.gov—printed on Aug. 3, 2021 https.//www.hhs.gov/hipaa/index.html.

Deloitte: Medtechand the Internet of Medical Things, Jul. 2018 https://www.dlapiperdataprotection.com/ndex.html.

Charlie Osborne "FDA issues recall of 465,000 St. Jude pacemakers to patch security holes", Zero Day, Aug. 30, 2017, https://www.zdnet.com/article/fda-forces-st-jude-pacemaker-recall-to-patch-security-vulnerabilities/.

Jessica Kim Cohen; Medical imaging company to pay $3 million HIPAA fine, Modern Healthcare, May 6, 2019, https://www.modernhealthcare.com/technology/medical-imaging-company-pay-3-million-hipaa-fine.

The Healthcare Industry—A Prime Target for Hackers and Data Breaches, Bluefin Blog, Jul. 30, 2018 https://www.bluefin.com/bluefin-news/the-healtcare-industry-a-prime-target-for-hackers-and-data-breaches/

Extended European Search Report for Application No. 20217107.0 dated Jun. 14, 2021.

* cited by examiner

SYSTEMS AND METHODS FOR MANAGING A MULTI-REGION SAAS MODEL

CROSS-REFERENCE TO RELATED APPLICATIONS

This application claims the benefit of U.S. Provisional Application Ser. No. 62/964,254, filed Jan. 22, 2020, and entitled "SYSTEMS AND METHODS FOR MANAGING A MULTI-REGION SAAS MODEL" which is hereby incorporated by reference in its entirety.

FIELD OF THE INVENTION

The present invention relates generally to establishing and managing a multi-region software as a service (SaaS) model, and specifically to assigning server instantiations to users and optimizing server instantiations.

BACKGROUND

Cloud computing may refer to a plurality of data centers, typically including high power computers with large storage capabilities, that are coupled to the Internet and offer computing services to users. Cloud computing may offer many advantages to SaaS providers, including relatively cheap computing power and scalability. For example, cloud computing architecture may allow SaaS providers to increase or decrease the computing power they consume to suit their needs in any given moment relatively easily.

As SaaS organizations grow and begin to extend their global reach, their larger geographic footprint may shape and influence the architecture of their cloud-based systems. Providing services to geographically distributed clients may motivate a SaaS provider to move towards a multi-region SaaS model, e.g., to a system with a plurality of data centers (also referred to as server sites) that are distributed geographically. A multi-region SaaS model may enable providing service that is physically closer to the end user and by that reduce the latency that is involved in remote SaaS services. In addition, multi-region cloud-based SaaS model may provide redundancy and better failover mechanisms, enabling the system to withstand regional system failures, by providing backup in an alternate region. A geographically distributed SaaS model may also improve operations, deployment, agility, security, and scalability.

However, moving to a multi-region SaaS model often presents challenges for SaaS organizations. A multi-region SaaS model is more complex than a single location model. The more complexity that is added to a system's operational and deployment profile, the more challenging it becomes to maintain the agility goals and responsiveness that are often associated with SaaS delivery models.

Thus, a method for efficiently establishing and managing a multi-region SaaS model is required.

SUMMARY

According to embodiments of the invention, a system and method for providing a multi-region software as a service model may include obtaining a list of allowed regions that can host data of a user from a source region; and automatically assigning a device associated with a new user from the source region to a computing system located in one of the allowed countries or regions within a country.

Embodiments of the invention may include, obtaining location information from the device during registration; and determining the source region based on the location information.

According to embodiments of the invention, obtaining the location information may be performed by: gathering location information by the device using at least one of: hypertext markup language 5 (HTML5) geolocation application programming interface (API), an external API, global positioning system (GPS), Wi-Fi triangulation and mobile area code; determining the source region based on the location information; displaying the source region to the new user; and obtaining confirmation from the user if the determined source region is correct and obtaining a corrected source region if not.

According to embodiments of the invention, the computing system comprises a cloud instantiation.

Embodiments of the invention may include, optimizing devices association to the cloud instantiation to minimize a number of the cloud instantiations.

According to embodiments of the invention, assigning the device to the cloud instantiation may include: checking whether an existing cloud instantiation exists in one of the allowed regions; and if one or more existing cloud instantiations exist in one of the allowed regions, assigning the device to one of the existing cloud instantiations; and otherwise, creating a new cloud instantiation in one of the allowed regions and assigning the device to the new cloud instantiation.

Embodiments of the invention may include, if one cloud instantiation exists in one of the allowed regions, assigning the device to the existing cloud instantiation; and if more than one cloud instantiations exist in one of the allowed regions, then: selecting one of the existing cloud instantiations based on one or more criteria; and assigning the device to the selected cloud instantiation.

Embodiments of the invention may include, if more than one cloud instantiations exist in one of the allowed regions, assigning the device to the existing cloud instantiation that is geographically closest to the source region.

Embodiments of the invention may include, if more than one cloud instantiations exist in one of the allowed regions, assigning the device to the existing cloud instantiation that is the most inexpensive.

Embodiments of the invention may include, once a new cloud instantiation is generated: determining whether another cloud instantiation can be merged into the new cloud instantiation and if so, merging the other cloud instantiation into the new cloud instantiation.

According to embodiments of the invention, it may be determined that the other cloud instantiation can be merged into the new cloud instantiation if the other cloud instantiation hosts devices associated with users from source regions that are allowed to be hosted by the new cloud instantiation.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
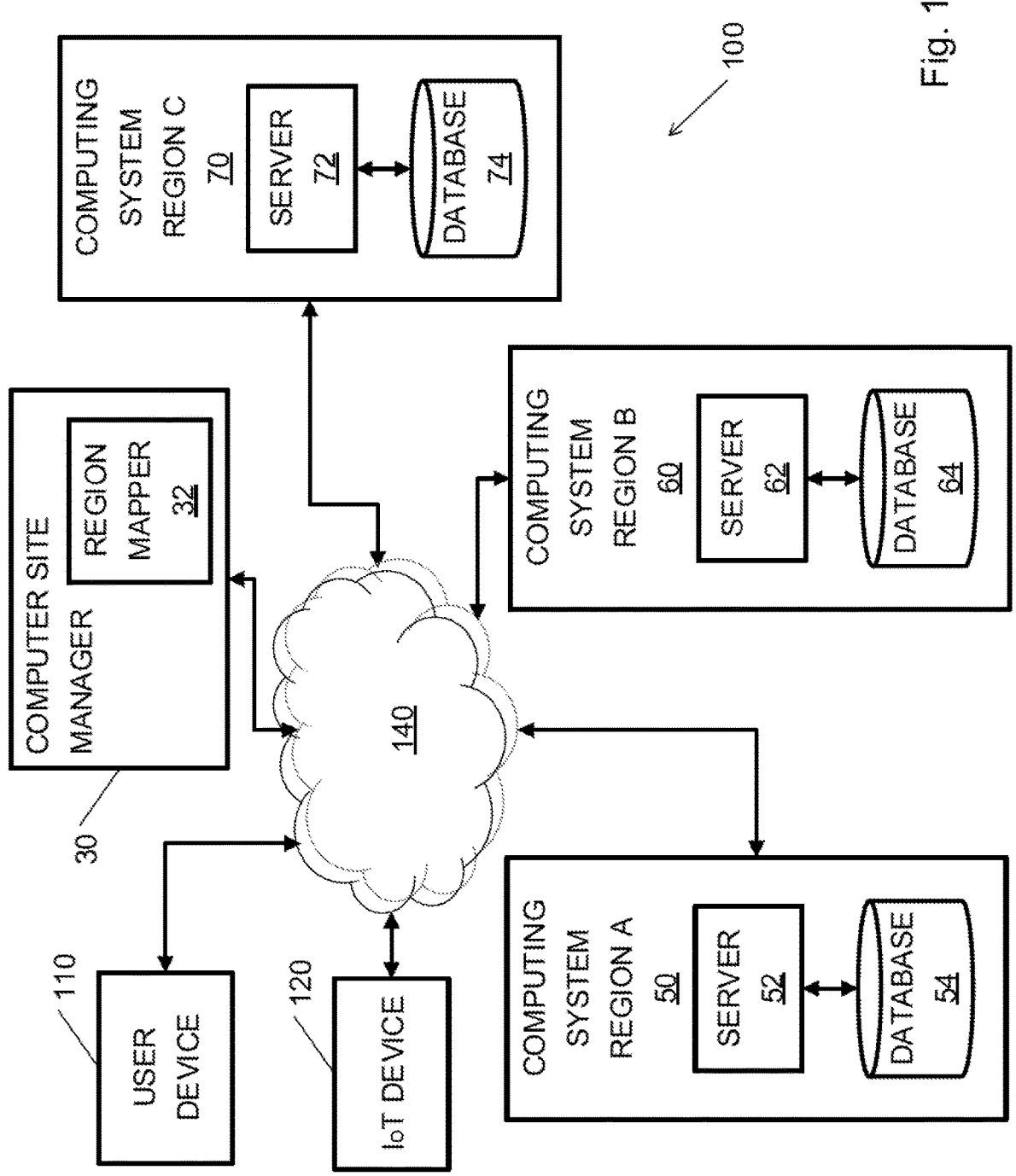
FIG. 1 schematically illustrates a system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

SaaS organizations may be required to store or host information in a computing system such as a computer, a data center, a server, a server farm, a server site, or a cloud-based computing system. However, storing personal sensitive data such as personal health data, financial data, credit data, student data, biometric data, information that can be used to carry out identity theft or fraud, etc., may be governed by privacy or data security laws and regulations. Among other things, such laws may limit the permitted or allowed geographic location of databases that store such sensitive data. Thus, to comply with local privacy or data security laws, SaaS organizations may be required to store personal and sensitive data associated with a user from a certain country or region only within a restricted list of allowed countries or regions, e.g., the computers and databases that handle and store the sensitive data must be physically located within an allowed region or country. A region may be for example a geographic or political area of the world, e.g., the United States, Europe, North America, or the commonwealth may be regions. A region may be another definition of geographic area. As used herein a source region may refer to a geographic or political area of the world that is associated with the user.

Thus, when opening a new account, or onboarding a new user, e.g., a user that is unfamiliar to the system and is registering to the system for the first time, to a geographically distributed SaaS system, the sensitive information may need to be stored in an allowed region or country. Storing sensitive information in an allowed or permitted region or country may be a complex task for multi-region SaaS systems, since for example, this may require asking new users to manually provide their location data during the signup, and manually directing the user to a computing system physically located in an appropriate location. In addition, in order to know which region or country may or is permitted to host or store data generated by users of other regions or countries, one has to use lawyers and/or manually gather this information, e.g., from dedicated websites.

Existing multiregional onboarding routing methodology requires the user to manually provide identification such as country and/or region. The system may store the new account data in an appropriate region, based on the identification information provided by the user. This manual procedure may be error prone since it relies on information provided by the user. There are also situations where a system administrator is required to manually configure each user device or IoT device and its designated region.

When onboarding a new user, some SaaS models will not onboard a user if the user is not within their allowed countries, or limit the downloading of software and purchasing of devices to their allowed countries. This may create unnecessary rigidness in the SaaS model, limit the business model and may cause revenue loss to SaaS organizations.

Embodiments of the invention may improve the technology of cloud computing by providing an automated onboarding process according to location information which may be collected from the user or the device used by the user during registration. Embodiments of the invention may provide a region mapper that may automate the search of computing system located at possible countries, regions or districts. Given a source region or country, the region mapper may return a list of possible countries, regions or districts (or a list of computer systems located at the possible countries, regions or districts), that are compliant with the regulation at the source region or country. The region mapper may include or may be implemented as a table, a list, a database, or as a service API, that may provide the list from an external source, e.g., an external cloud service.

According to some embodiments of the invention, the user may not have to provide his location details. Instead, the autonomous multi-region service may direct users and/or devices to a computing system in their relevant region without any human intervention using their geolocation and other parameters.

In some embodiments, for example when cloud computing is used, the autonomous multi-region service may provide additional level of flexibility and automation. For example, in case that the autonomous multi-region service would identify onboarding to a nonexistent region (e.g., a region with no existing cloud instantiations), the autonomous multi-region service may establish a cloud instantiation at an allowed location automatically. Thus, embodiments of the invention may eliminate the need to deploy cloud instantiations ahead, before actual need is detected. Cloud computing may refer to a shared pool of configurable computing resources, including for example, servers, storage, networks, etc. A cloud instantiation may refer to a single physical computer or virtual machine in a cloud computing environment.

Furthermore, embodiments of the invention may improve the technology of cloud computing by improving or optimizing distribution of users among cloud instantiations, to reduce or minimize the number of cloud instantiations according to actual system users.

Embodiments of the invention may improve the technology of cloud computing by providing a computer sites manager (or cloud computing manager) that may automate the search of possible computer sites or cloud instantiations in allowed countries or regions, onboard users, user devices and/or internet of things (IoT) devices into a relevant computer sites or cloud instantiation substantially without any human intervention using a geolocation of the user, user device or IoT device, and other parameters. Embodiments of the invention may enable automatic creation of a cloud instantiation in case an onboarding to a none existed region is identified. Geolocation may refer to the identification or estimation of the real-world geographic location (e.g., physical location) of a device, such as a mobile phone, a smartphone, or Internet-connected computer. In its simplest form, geolocation may include a set of geographic coordinates, that may be calculated or estimated using any applicable positioning system including, but not limited to, a GPS, Wi-Fi triangulation, mobile networks triangulation, etc. Geolocation may be enhanced by other location related information such as Internet protocol (IP) address, mobile area code, satellite images, etc. The coordinates provided by the positioning systems, as well as the other positioning information, may be used to determine a meaningful location (e.g. a region, a city or a country) in which the device is physically located.

Reference is made to FIG. 1, which schematically illustrates a system 100, according to embodiments of the invention. System 100 may include one or more user devices 110, one or more Internet of things (IoT) devices 120, one or more computing systems 50, 60, 70, and an computer sites manager 30, that are connected to network 140 and may communicate through network 140. Other system architectures may be used.

Networks 140 may include any type of network or combination of networks available for supporting communication between user devices 110, IoT devices 120, computing systems 50, 60, 70, and computer sites manager 30. Networks 140 may include for example, wired and wireless telephone networks, the Internet and intranet networks, etc.

Figure 4:
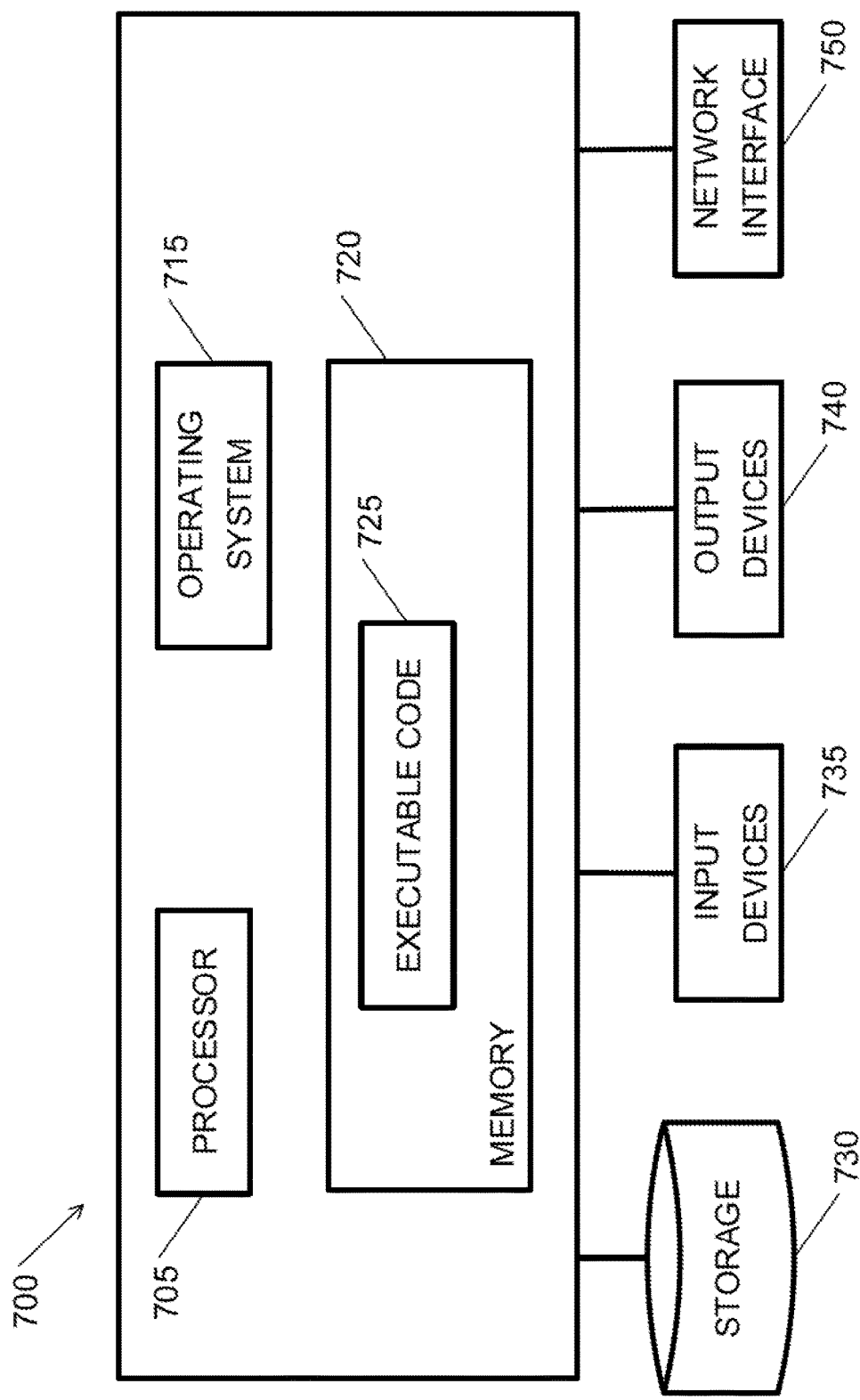
FIG. 4 illustrates an example computing device according to an embodiment of the invention.

Each of user devices 110, IoT devices 120, servers 52, 62, 72, and computer sites manager 30 may be or may include a computing device such as computing device 700 depicted in FIG. 4. One or more databases 54, 64 and 74 may be or may include a storage device such as storage device 730. User device 110 may be or may include any personal computing device such as a personal computer, a smartphone, a handheld device, etc. IoT devices 120 may be or may include devices that are connected to network 140, and specifically to the Internet, and are able to communicate, or at least transmit data to other devices over network 140. For example, IoT devices 120 may include home appliances, wearables, medical devices etc.

Computing systems 50, 60, 70, also referred to as servers, server sites and hosting or storage sites, may include a computer, e.g., a physical or logical computer, virtual machines, and the like. In some embodiments computing systems 50, 60, 70 are deployed using cloud computing as one or more cloud instantiations. While the architecture and implementation of each of computing systems 50, 60, 70 may be complex and include logical computers and virtual machines, at the basic level all computing systems 50, 60, 70 include some instantiation of a physical server 52, 62 and 72 (e.g., a computing device such as computing device 700) and a databases 54, 64 and 74 (e.g., a storage device such as storage device 730). Physical server 52, 62, 72 and databases 54, 64, 74 may each be located at some physical location. In the example presented in FIG. 1, computing system 50 includes server 52 and database 54, both located in region A, computing system 60 includes server 62 and database 64, both located in region B, and computing system 70 includes server 72 and database 74, both located in region C. Computing systems 50, 60, 70 may be used by SaaS organizations to store application data and provide software services to clients.

Computer sites manager 30 may include an application or software executed by a computing device such as computing device 700 depicted in FIG. 4. Computer sites manager 30 may execute a site manager service API that may map new and existing user devices 110 and IoT devices 120 to computing systems 50, 60, 70 according to embodiments of the invention. For example, if the application data used by the SaaS organization includes personal or sensitive data, then computer sites manager 30 may store the personal or sensitive data in one or more of computing systems 50, 60, 70 that are physically located in an allowed region or country.

According to some embodiments, computer sites manager 30 may obtain or have access to region mapper 32. Region mapper 32 may include a list, a table or a database associating each supported source location (e.g., source region or country) to the countries or regions that are allowed to store data from the source location (e.g., allowed countries or regions), or to computing systems 50, 60, 70 located at the allowed countries or regions. In some embodiments, region mapper 32 may include an API that may provide the list from an external source, e.g., an external cloud service. According to some embodiments, computer sites manager 30 may obtain the geolocation and other parameters of user devices 110 and IoT devices 120, e.g., upon registration or when otherwise needed. Computer sites manager 30 may determine the source location of the user based on the geolocation of and other parameters obtained from user devices 110 and IoT devices 120, and may allocate a computing system (e.g., one of computing systems 50, 60, 70) that is physically located in an allowed region or country based on the source location and the list or table of allowed countries or regions for each source location as provided by region mapper 32. Upon registration of a new user, e.g., via a user device 110 or via an IoT device 120 associated with the user, computer sites manager 30 may automatically (e.g., without querying and getting instructions from a user or a human system operator), assign user device 110 or IoT device 120 associated with the new user to a computing systems 50, 60, 70 located in one of the allowed countries or regions, e.g., an account for the user, user device 110 or IoT device 120, may be opened or established on the computing system 50, 60, 70 to which the user is assigned.

According to some embodiments, computer sites manager 30 may obtain location information from user devices 110 or IoT devices 120, e.g., during registration, and determine the source region, area or country based on the obtained location information. For example, during registration, location information may be gathered by the registered user device 110 or IoT device 120 using one or more sources of information included in the device such as a geolocation API, a HTML5 geolocation API, an external geolocation API (e.g., $3^{rd}$ party technologies to detect the location of a device), a GPS, Wi-Fi triangulation, mobile networks triangulation, IP address and mobile area code. The source region or country may be determined based on the location information. In some embodiments, the user may be requested to confirm the source region or country. For example, the source region or country as determined by the device may be displayed to the new user, and the user may confirm the source region or country if the source region or country is correct, and a correct the source region or country if not.

According to some embodiments, computer sites manager 30 may determine allowed regions or countries for user devices 110 or IoT devices 120 based on the source region or country. According to some embodiments, computer sites manager 30 may check whether a computing system exists in one of the allowed regions or countries, e.g., whether one of computing systems 50, 60, 70 is physically located in one of the allowed regions or countries. If one or more computing systems 50, 60, 70 is physically located in one of the allowed regions or countries, computer sites manager 30 may assign the device to one of the existing computing system that is physically located in one of the allowed regions or countries. If more than one computing systems 50, 60, 70 exists in one of the allowed regions or countries, computer sites manager 30 may select one of the computing systems that is physically located in one of the allowed regions or countries for assigning the device based on one or more criteria, e.g., considering the physical distance of the allowed computing systems from the device, the cost of storing data at each of the allowed computing systems, the available free space at the allowed computing systems, etc. For example, if more than one computing systems 50, 60, 70 exist in one of the allowed countries, computer sites manager 30 may assign the device to the existing computing system that is geographically closest to the source region, to the existing computing system that is the most inexpensive, etc., based on the predefined criteria. If none of computing systems 50, 60, 70 is physically located in one of the allowed regions, computer sites manager 30 may refuse the new user.

Figure 2:
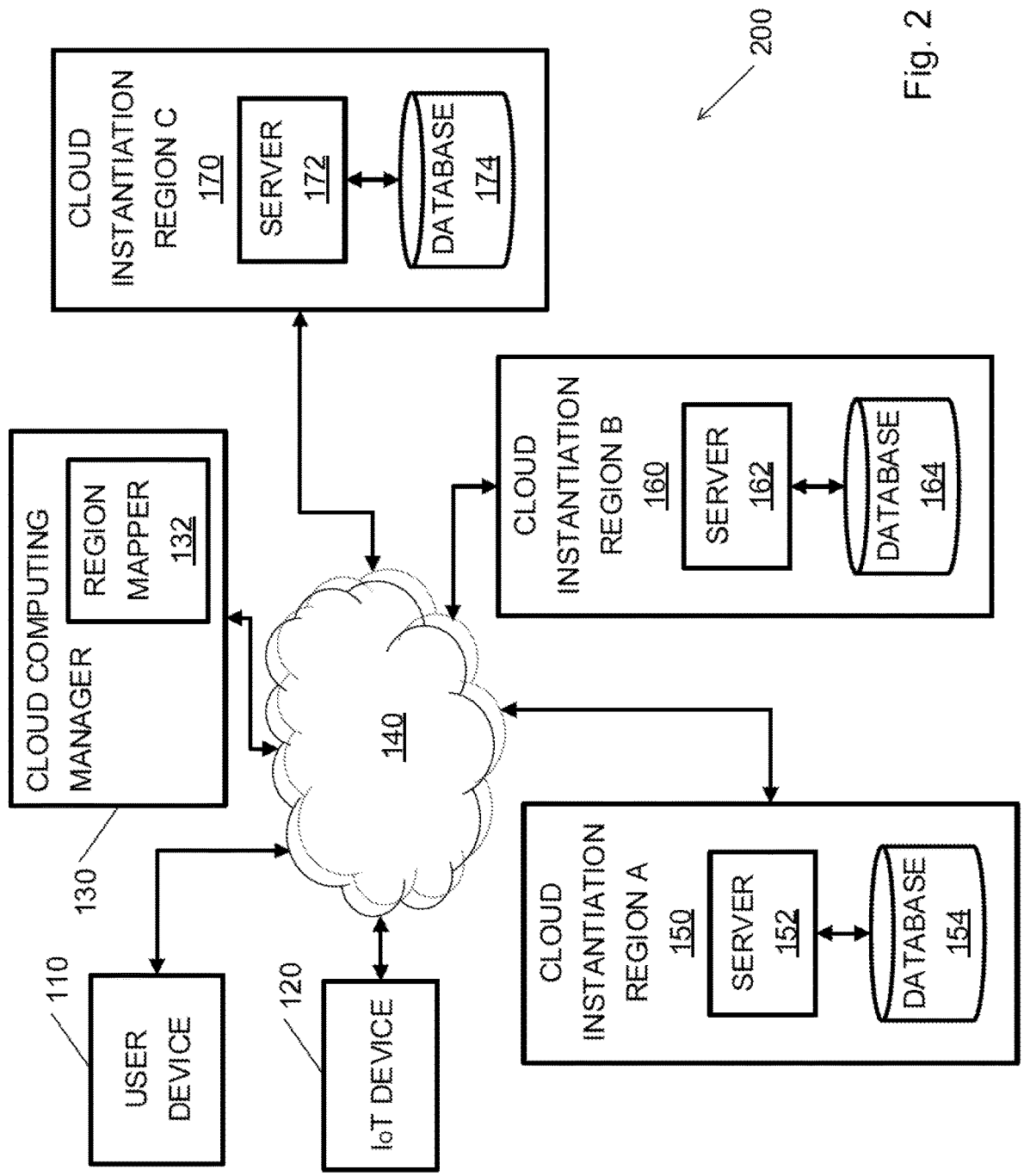
FIG. 2 schematically illustrates a second system, according to embodiments of the invention.

Reference is made to FIG. 2, which schematically illustrates a system 200, according to embodiments of the invention. System 200 may be similar to system 100 and similar components are given similar reference numerals. In system 200, however, some or all of computing systems 50, 60, 70 are deployed using cloud computing as one or more cloud instantiations 150, 160, 170. Cloud computing may allow more flexibility and optimization compared with computing systems 50, 60, 70, as disclosed herein. For example, cloud instantiations 150, 160, 170 may be established and canceled on demand, as disclosed herein.

System 200 may include one or more user devices 110, one or more Internet of things (IoT) devices 120, one or more cloud instantiations 150, 160, 170, and a cloud computing manager 130, that are connected to and may communicate through network 140. Other system architectures may be used. It should be readily understood by those skilled in the art that a single system, e.g., such as systems 100 and 200 may include a combination of computing systems such as computing systems 50, 60, 70 and cloud instantiations such as cloud instantiations 150, 160, 170.

Networks 140 may include any type of network or combination of networks available for supporting communication between user devices 110, IoT devices 120, cloud instantiations 150, 160, 170, and cloud computing manager 130. Each of servers 152, 162, 172, and cloud computing manager 130 may be or may include a computing device such as computing device 700 depicted in FIG. 4. One or more databases 154, 164 and 174 may be or may include a storage device such as storage device 730.

Cloud instantiations 150, 160, 170, also referred to as cloud hosting sites, may include a computer system, e.g., a physical or logical computer, virtual machines and the like. While the architecture and implementation of each of cloud instantiations 150, 160, 170 may be complex and include logical computers and virtual machines, at the basic level all cloud computers include some instantiation of a physical server 152, 162 and 172 (e.g., a computing device such as computing device 700) and a databases 154, 164 and 174 (e.g., a storage device such as storage device 730). Physical server 152, 162, 172 and databases 154, 164, 174 may each be located at some physical location. In the example presented in FIG. 2 cloud instantiation 150 includes server 152 and database 154, both located in region A, cloud instantiation 160 includes server 162 and database 164, both located in region B, and cloud instantiation 170 includes server 172 and database 174, both located in region C. Cloud instantiations 150, 160, 170 may be used by SaaS organizations to store application data and provide software services to clients.

Cloud computing manager 130 may include an application or software executed by a computing device such as computing device 700 depicted in FIG. 4. Cloud computing manager 130 may execute a cloud computing service API that may map new and existing user devices 110 and IoT devices 120 to cloud instantiations 150, 160, 170 according to embodiments of the invention. For example, if the application data used by the SaaS organization includes personal or sensitive data, then cloud computing manager 130 may store the personal or sensitive data in one or more of cloud instantiations 150, 160, 170 that are physically located in an allowed region or country.

According to some embodiments, cloud computing manager 130 may obtain or have access to region mapper 132. Region mapper 132 may include a list, a table or a database associating each supported source location (e.g., source region or country) to the countries or regions that are allowed to store or host data from the source location (e.g., allowed countries or regions), or to cloud instantiations 150, 160, 170 located at the allowed countries or regions. In some embodiments, region mapper 132 may include an API that may provide the list from an external source, e.g., an external cloud service. According to some embodiments, cloud computing manager 130 may obtain the geolocation and other parameters of user devices 110 and IoT devices 120, e.g., upon registration. Cloud computing manager 130 may determine the source location of the user based on the geolocation of and other parameters obtained from user devices 110 and IoT devices 120, and may allocate a cloud instantiation (e.g., one of cloud instantiations 150, 160, 170) that is physically located in an allowed region or country based on the source location and the list or table of allowed countries or regions for each source location, e.g., provided by region mapper 132. Upon registration of a new user, e.g., via a user device 110 or via an IoT device 120 associated with the user, cloud computing manager 130 may automatically assign user device 110 or IoT device 120 associated with the new user to a cloud instantiation 150, 160, 170 located in one of the allowed countries or regions.

According to some embodiments, cloud computing manager 130 may obtain location information from user devices 110 or IoT devices 120 during registration, and determine the source region based on the obtained location information. For example, during registration, location information may be gathered by the registered user device 110 or IoT device 120 using one or more sources of information included in the device such as a geolocation API (e.g., HTML5 geolocation API), a GPS, Wi-Fi triangulation, mobile networks triangulation, IP address and mobile area code. The source region or country may be determined based on the location information. In some embodiments, the user may be requested to confirm the source region or country. For example, the source region or country as determined by the device may be displayed to the new user, and the user may provide input to confirm or indicate as incorrect the source region or country if the source region or country is correct, and a correct the source region or country if not.

According to some embodiments, cloud computing manager 130 may check whether a cloud instantiation exists in one of the allowed regions or countries, e.g., whether one of cloud instantiation 150, 160, 170 is physically located in one of the allowed regions or countries. If one or more cloud instantiations 150, 160, 170 is physically located in one of the allowed regions or countries, cloud computing manager 130 may assign the device to one of the existing cloud instantiations that is physically located in one of the allowed regions or countries. If more than one cloud instantiations 150, 160, 170 exists in one of the allowed regions or countries, cloud computing manager 130 may select one of the cloud instantiations that is physically located in one of the allowed regions or countries for assigning the device either randomly or based on one or more criteria, e.g., considering the physical distance of the allowed cloud instantiations from the device, the cost of storing data at each of the allowed cloud instantiations, the available free space at the allowed cloud instantiations, etc. For example, if more than one cloud instantiations 150, 160, 170 exist in one of the allowed countries, cloud computing manager 130 may assign the device to the existing cloud instantiation that is geographically closest to the source region, to the existing cloud instantiation that is the most inexpensive, etc., based on the predefined criteria. If none of cloud instantiation 150, 160, 170 is physically located in one of the allowed regions, cloud computing manager 130 may create a new cloud instantiation in one of the allowed regions or countries and assign the device to the new cloud instantiation.

According to some embodiments, cloud computing manager 130 may change or rearrange the association of user devices 110 and IoT devices 120 to cloud instantiations 150, 160, 170 to improve or optimize cloud instantiations 150, 160, 170, for example, to minimize a number of the cloud instantiations 150, 160, 170 according to an actual volume of user devices 110 and IoT devices 120. Cloud computing manager 130 may optimize association of user devices 110 and IoT devices 120 to cloud instantiations 150, 160, 170 to improve or minimize other criteria or a combination of criterions such as cost, distance, latency etc. For example, cloud computing manager 130 may determine whether one cloud instantiation, e.g., cloud instantiation 150, can be merged into another cloud instantiation, e.g., cloud instantiation 160. For example, cloud computing manager 130 may determine that an existing cloud instantiation may be merged into the new cloud instantiation if the existing cloud instantiation hosts devices associated with users from source countries or regions that are allowed to or permitted to be hosted or stored by the new cloud instantiation. If it is determined that the two cloud instantiations can be merged, cloud computing manager 130 may merge the two cloud instantiations into a single cloud instantiation, e.g., cloud instantiations 150 and 160 may be merged (after data migration) into cloud instantiation 160, and cloud instantiation 150 may be canceled.

Figure 3:
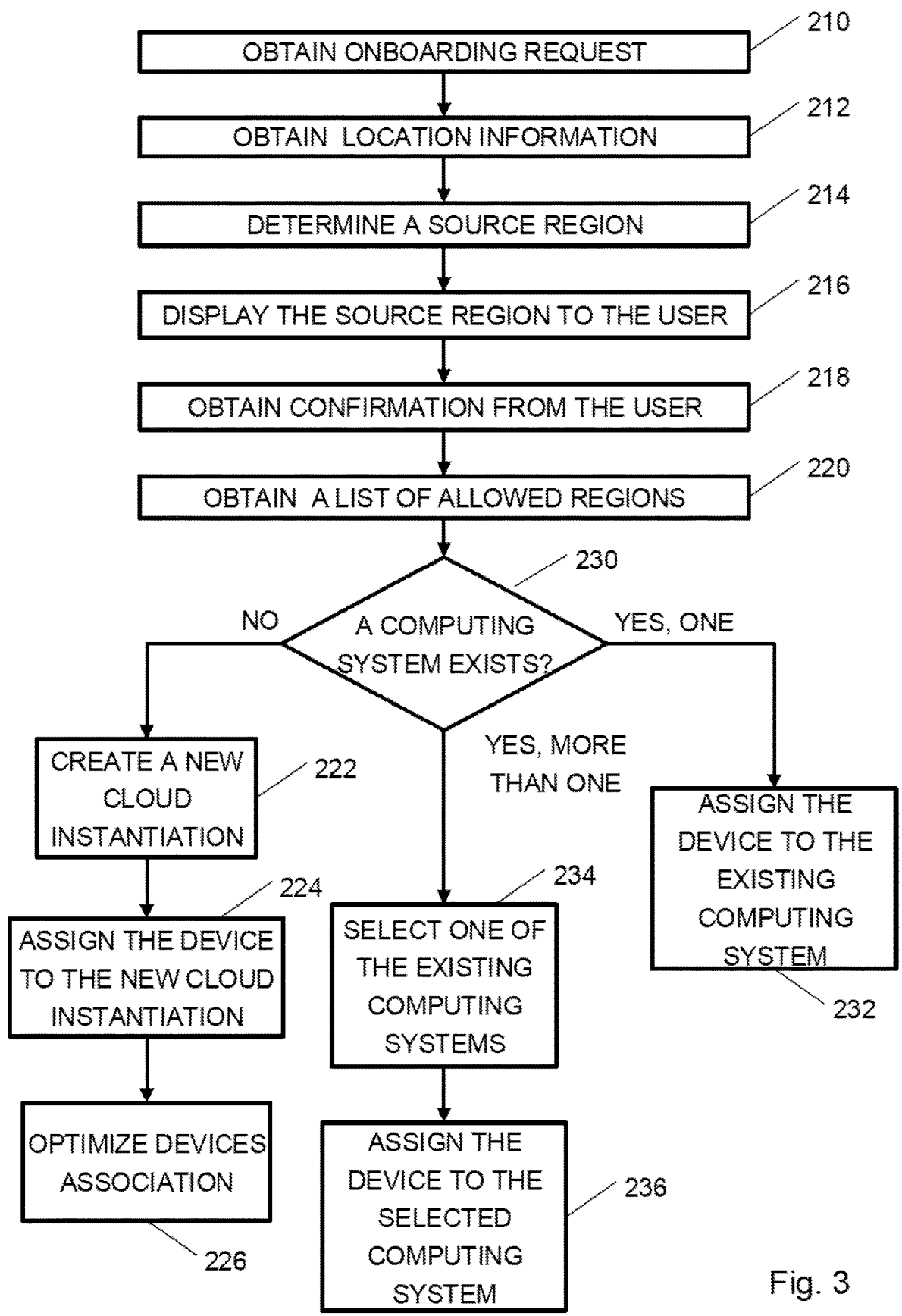
FIG. 3 is a flowchart of a method for assigning computing systems to users, according to embodiments of the invention.

Reference is made to FIG. 3, which is a flowchart of a method for assigning computing systems to users, according to embodiments of the invention. An embodiment of a method for assigning computing systems to users may be performed, for example, by the systems shown in FIGS. 1, 2 and 4, but other hardware may be used.

In operation 210, a request for onboarding a device or a user may be obtained. The user may register via a user device (e.g., user device 110) or a an IoT device (e.g., IoT device 120). In operation 212, location information may be obtained from the device. In some embodiments, the location information may be obtained during registration or onboarding of the new user (via the device) to the system. According to some embodiments the location information may be obtained from a geolocation API, GPS, Wi-Fi triangulation, mobile networks triangulation, IP address and mobile area code, etc. Other sources for the location information may be used. In operation 214, a source region or source country may be determined based on the location information. In operation 216, the source region or source country may be presented to the user. In some embodiments, more than one source region or source country may be presented to the user in case a definite determination of the source region or source country is not possible based on the location data, for example, if the device is located near a border between two source regions or source countries. In operation 218, the user may confirm the source region or source country, or amend if the source region or country determined in operation 214 is wrong. If more than one source regions or source countries were presented to the user, the user may select the correct source region or source country. In operation 220, a list of allowed regions or countries that can or are permitted to host data of users from (e.g. being located in) the source region or country may be obtained. The list may be pre-prepared based on local privacy or data security laws that may restrict the allowed regions or countries that may store personal or sensitive data.

In operation 230, it may be determined whether a computing system (cloud-based or non-cloud based, including a cloud instantiation, a server, a server site and a hosting site) exists in one of the allowed regions or countries. For example, a list or a table associating allowed regions or countries to source regions or countries may be traversed, to find allowed regions or countries for the source region or country determined in operations 214-218. Then, a list of computing systems (e.g., computing systems 50, 60, 70 and/cloud instantiations 150, 160, 170) and their physical locations, may be traversed to find a computing system that is physically located in one of the allowed regions or countries. If no computing system that is located in one of the allowed regions or countries is found, then in operation 222, a new cloud instantiation may be created or established in one of the allowed regions or countries. In operation 224, the device associated with the new user may be automatically assigned to the new cloud instantiation that was created in operation 222.

If it is determined in operation 230 that only one computing system exists in the allowed countries or regions, then in operation 232, the device associated with the new user may be automatically assigned to the single computing system that exists in the allowed countries or region. If it is determined in operation 230 that more than one computing system exist in the allowed countries or regions, then in operation 234, one of the computing system that exist in the allowed countries or regions may be selected. The computing system may be selected based on one or more criteria. The criteria may include logic that may consider the distance of the computing system from the registered device, the cost of using the computing system, the free space available at the computing system, and other parameters. A selection algorithm may be defined, considering one or more selection criterions. For example, the existing computing system that is geographically closest to the source region or country or to the device itself may be selected, or the existing computing system that is the most inexpensive may be selected. In operation 236, the device may be assigned to the selected computing system.

In operation 226, device association to cloud instantiations may be optimized to minimize a number of the cloud instantiations according to an actual volume of devices (or to minimize other criteria). According to some embodiments, optimization may be performed for cloud instantiation by taking advantage of the flexibility provided by cloud computing. According to some embodiments, optimization may be done following generation of a new cloud instantiation, periodically, at predetermined intervals or following other changes in one or more of cloud instantiations 150, 160, 170, e.g., price reduction at one of cloud instantiations 150, 160, 170 etc.

According to some embodiments, optimization may be performed upon creating a new cloud instantiation, e.g., as performed in operation 222. For example, upon creating a new cloud instantiation, it may be determined whether other existing one or more cloud instantiations may be merged into the new cloud instantiation. Determining whether an existing cloud instantiation may be merged into a new cloud instantiation may be performed by traversing the list of devices or users assigned to or hosted by the existing cloud instantiation, and verifying that these users and devices may be assigned to the new cloud instantiation, e.g., based on the source regions or countries of the devices and users assigned to the existing cloud instantiation. If it is determined that all the users assigned to or hosted by the existing cloud instantiation may be hosted by the new cloud instantiation, the existing cloud instantiation may be merged into the new cloud instantiation by transferring the accounts of the users that are assigned to the existing cloud instantiation to the new cloud instantiation and closing or canceling the previously existing cloud instantiation.

According to some embodiments, optimization or changes in cloud deployment may be performed following changes in regulation. For example, if historically sensitive data from a first country was stored in a second country, and regulation in the first country has changed so that storing the sensitive data in the second county is no longer allowed, than data previously stored on a computing system located in the second country and originating from the first country may be moved a computing system that is located in an allowed region in accordance with the new regulation. If no computing system is available in any of the current allowed countries or regions, a new cloud instantiation may be created in one of the currently allowed countries or regions.

Another change in regulation that may result in optimization or changes in cloud deployment may include loosening of regulatory demands. For example, if regulation has changed to include more allowed countries or regions, then it may be possible to unify cloud instantiations. For example, a first country that has previously allowed to store data only within the first country has changed the regulation to allow storing the data in a second country. Accordingly, data that was stored in a first cloud instantiation that was geographically located within the first country, may be moved to a second cloud instantiation that is located in the second country that is now allowed to store data originating from the first country, and the first cloud instantiation may be removed, canceled or closed.

According to some embodiments, optimization or changes in cloud instantiation may be performed following changes in a client's preferences. For example, if all users (e.g., user devices and IoT devices) associated with a cloud instantiation have left the service or discontinued the service, the cloud instantiation may be canceled. Other scenarios for canceling cloud instantons may result from other regulatory changes. For example, if a cloud instantiation in a certain allowed region was used to store data from IoT devices, e.g., a medical device, and regulation has changed so that usage of this device is prohibited in the source country, the IoT devices may gradually disconnect from the cloud instantiation and the cloud instantiation will eventually be cancelled. Other triggers for optimization, adding and removing cloud instantiation may apply, based on the specific application.

FIG. 4 illustrates an example computing device according to an embodiment of the invention. Various components such as user device 110, IoT device 120, computing systems 50, 60, 70, cloud instantiations 150, 160, 170 and cloud computing manager 130, may be or may include computing device 700, or may include components such as shown in FIG. 4. For example, a first computing device 700 with a first processor 705 may be used to execute a region mapper service API that may map new and existing user devices 110 and IoT devices 120 to cloud instantiations 150, 160, 170, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include region mapper service API that may map new and existing user devices 110 and IoT devices 120 to cloud instantiations 150, 160, 170 according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 4 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for providing a multi-region software as a service model, the method comprising:
   obtaining a list of allowed regions that can host data of a user from a source region;
   automatically assigning a device associated with a new user from the source region to a computing system located in one of the allowed regions, wherein the computing system comprises a cloud instantiation; and
   once a new cloud instantiation is generated, determining that another cloud instantiation can be merged into the new cloud instantiation and in response to determining that the another cloud instantiation can be merged into the new cloud instantiation, merging the another cloud instantiation into the new cloud instantiation, wherein it is determined that the another cloud instantiation can be merged into the new cloud instantiation if the another cloud instantiation hosts devices associated with users from source regions that are allowed to be hosted by the new cloud instantiation.

2. The method of claim 1, further comprising:
   obtaining location information from the device during registration; and
   determining the source region based on the location information.

3. The method of claim 2, wherein obtaining the location information is performed by:
   gathering location information by the device using at least one of: a hypertext markup language 5 (HTML5) geolocation application programming interface (API), an external geolocation API, a global positioning system (GPS), Wi-Fi triangulation and mobile area code;
   determining the source region based on the location information;
   displaying the source region to the new user; and
   obtaining confirmation from the user if the determined source region is correct and obtaining a corrected source region if not.

4. The method of claim 1, further comprising optimizing device associations to the cloud instantiation to minimize a number of the cloud instantiations.

5. The method of claim 1, wherein assigning the device to the cloud instantiation comprises:
   checking whether an existing cloud instantiation exists in one of the allowed regions; and
   if one or more existing cloud instantiations exist in one of the allowed regions, assigning the device to one of the existing cloud instantiations; and
   otherwise, creating a new cloud instantiation in one of the allowed regions and assigning the device to the new cloud instantiation.

6. The method of claim 1, further comprising:
   if one cloud instantiation exists in one of the allowed regions, assigning the device to the existing cloud instantiation; and
   if more than one cloud instantiations exist in one of the allowed regions, then:
      selecting one of the existing cloud instantiations based on one or more criteria; and
      assigning the device to the selected cloud instantiation.

7. The method of claim 1, further comprising if more than one cloud instantiations exist in one of the allowed regions, assigning the device to the existing cloud instantiation that is geographically closest to the source region.

8. The method of claim 1, further comprising if more than one cloud instantiations exist in one of the allowed regions, assigning the device to the existing cloud instantiation that is the most inexpensive.

9. A system for providing a multi-region software as a service model, the system comprising:
   a memory;
   a processor configured to:
      obtain a list of allowed regions that can host data of a user from a source region;
      automatically assign a device associated with a new user from the source region to a computing system located in one of the allowed regions, wherein the computing system comprises a cloud instantiation; and
      once a new cloud instantiation is generated, the processor is configured to determine whether another cloud instantiation can be merged into the new cloud instantiation and if so, merge the another cloud instantiation into the new cloud instantiation, wherein the processor is configured to determine that the another cloud instantiation can be merged into the new cloud instantiation if the another cloud instantiation hosts devices associated with users from source regions that are allowed to be hosted by the new cloud instantiation.

10. The system of claim 9, wherein the processor is configured to:
    obtain location information from the device during registration; and
    determine the source region based on the location information.

11. The system of claim 10, wherein the processor is configured to obtain the location information by:
    gathering location information by the device using at least one of: a hypertext markup language 5 (HTML5) geolocation application programming interface (API), an external geolocation API, a global positioning system (GPS), Wi-Fi triangulation and mobile area code;
    determining the source region based on the location information;
    displaying the source region to the new user; and
    obtaining confirmation from the user if the determined source region is correct and a corrected source region if not.

12. The system of claim 9, wherein the processor is configured to optimize device associations to the cloud instantiation to minimize a number of the cloud instantiations.

13. The system of claim 9, wherein the processor is configured to assign the device to the cloud instantiation by:
    checking whether an existing cloud instantiation exists in one of the allowed regions; and
    if one or more existing cloud instantiations exist in one of the allowed regions, assigning the device to one of the existing cloud instantiations,
    and otherwise, creating a new cloud instantiation in one of the allowed regions and assigning the device to the new cloud instantiation.

14. The system of claim 9, wherein the processor is configured to:
    if one cloud instantiation exists in one of the allowed regions, assign the device to the existing cloud instantiation; and
    if more than one cloud instantiations exist in one of the allowed regions, then:

select one of the existing cloud instantiations based on one or more criteria; and
assign the device to the selected cloud instantiation.

\* \* \* \* \*